Nov. 2, 1954

H. M. ROCKWELL

2,693,228

TIRE CHANGING STAND WITH CIRCUMFERENTIALLY TRAVELING PIVOTED TOOL SUPPORT

Filed Sept. 23, 1950

INVENTOR
Hugh M. Rockwell
BY
Arthur Wright
ATTORNEY

Nov. 2, 1954

H. M. ROCKWELL 2,693,228

TIRE CHANGING STAND WITH CIRCUMFERENTIALLY
TRAVELING PIVOTED TOOL SUPPORT

Filed Sept. 23, 1950

INVENTOR
Hugh M. Rockwell
BY
Arthur Wright
ATTORNEY

Nov. 2, 1954   H. M. ROCKWELL   2,693,228
TIRE CHANGING STAND WITH CIRCUMFERENTIALLY
TRAVELING PIVOTED TOOL SUPPORT
Filed Sept. 23, 1950   9 Sheets-Sheet 5

INVENTOR
Hugh M. Rockwell
BY
Arthur Wright
ATTORNEY

Nov. 2, 1954 H. M. ROCKWELL 2,693,228
TIRE CHANGING STAND WITH CIRCUMFERENTIALLY
TRAVELING PIVOTED TOOL SUPPORT
Filed Sept. 23, 1950 9 Sheets-Sheet 7

INVENTOR
*Hugh M. Rockwell*
BY
*Arthur Wright*
ATTORNEY

United States Patent Office 2,693,228
Patented Nov. 2, 1954

2,693,228

TIRE CHANGING STAND WITH CIRCUMFERENTIALLY TRAVELING PIVOTED TOOL SUPPORT

Hugh M. Rockwell, Freeport, N. Y.

Application September 23, 1950, Serial No. 186,330

5 Claims. (Cl. 157—1.24)

My invention relates particularly to an apparatus to aid in tire-bead breaking, stripping, demounting and mounting of tires on wheels, and especially, for example, wheels carrying inflatable tires, such as those provided for automotive vehicles and airplanes.

The present invention is an improvement upon my application upon Machine for Mounting and Demounting Automotive and Aircraft Tires, Ser. No. 46,445, filed August 27, 1948, now Patent No. 2,652,078.

An object of this invention is to provide a more effective apparatus for bead breaking, stripping, demounting and mounting of the tires. Another object is to reduce the cost of manufacture of the apparatus. One of the objects is to provide a more effective drive-bar operation of the apparatus. A further object is to provide a more effective tool holding and operating means for said apparatus. Again, an object is to lock the tools in operative position more effectively. Still another object is to provide means for retracting the tool locking devices. An object is, furthermore, to provide a compound screw-locking means for locking the tool or tool holder in position in the tool holder shank and means for retracting the compound screw. Further objects of my invention will appear from the detailed description thereof hereinafter.

While my invention is capable of embodiment in many different forms, by way of illustration I have shown only certain embodiments of my invention in the accompanying drawings, in which—

Figure 4:
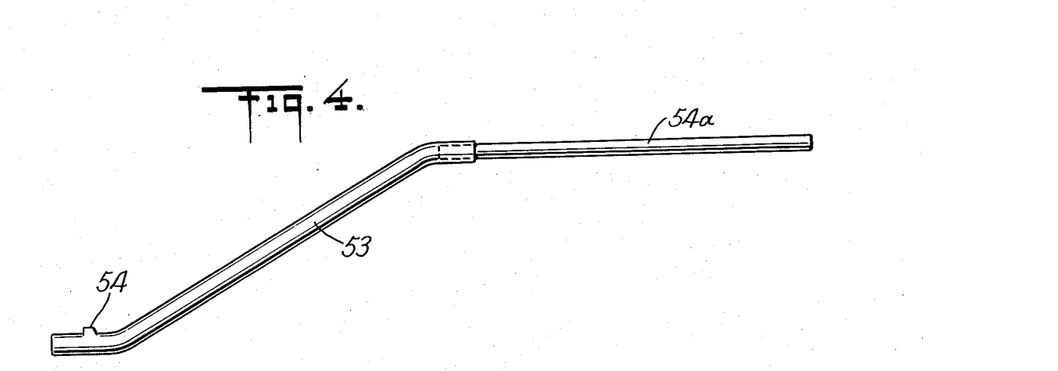
Fig. 4 is a side elevation of the drive-bar and the extension used therewith.
Figure 5:
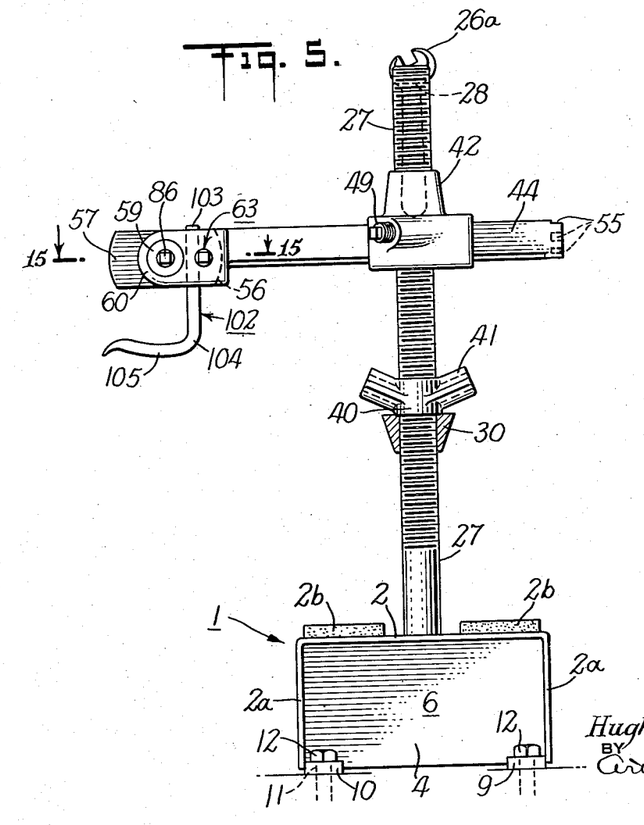
Fig. 5 is an end elevation of a machine made in accordance with my invention, using a small-diameter arbor having, for example, an "off" tool therein.
Figure 6:
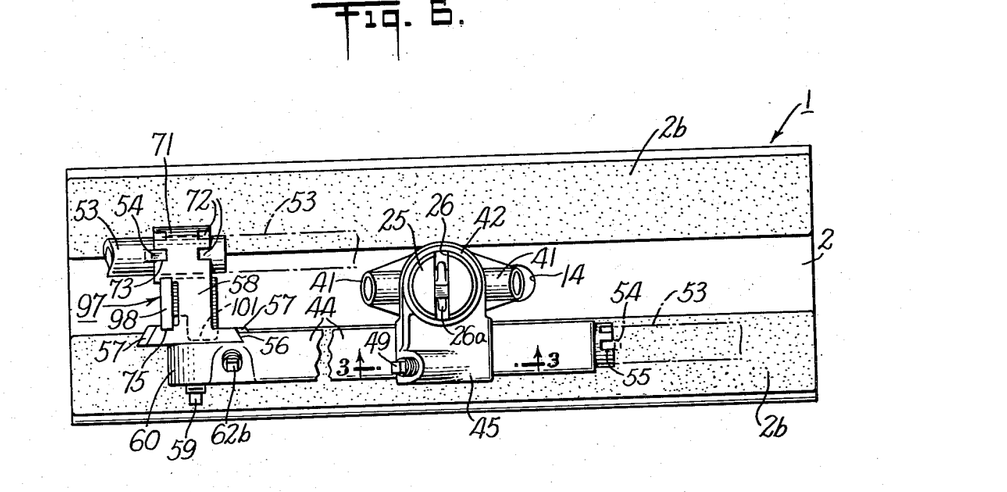
Fig. 6 is a plan view of the machine showing in Fig. 1.
Figure 7:
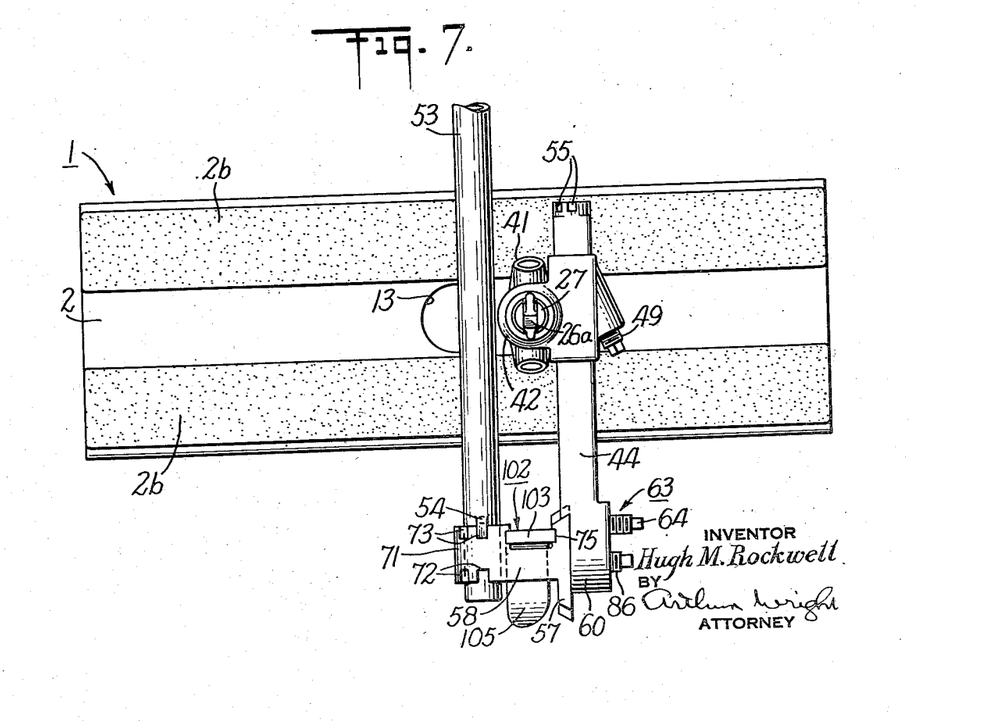
Fig. 7 is a plan view of the machine shown in Fig. 5.
Figure 8:
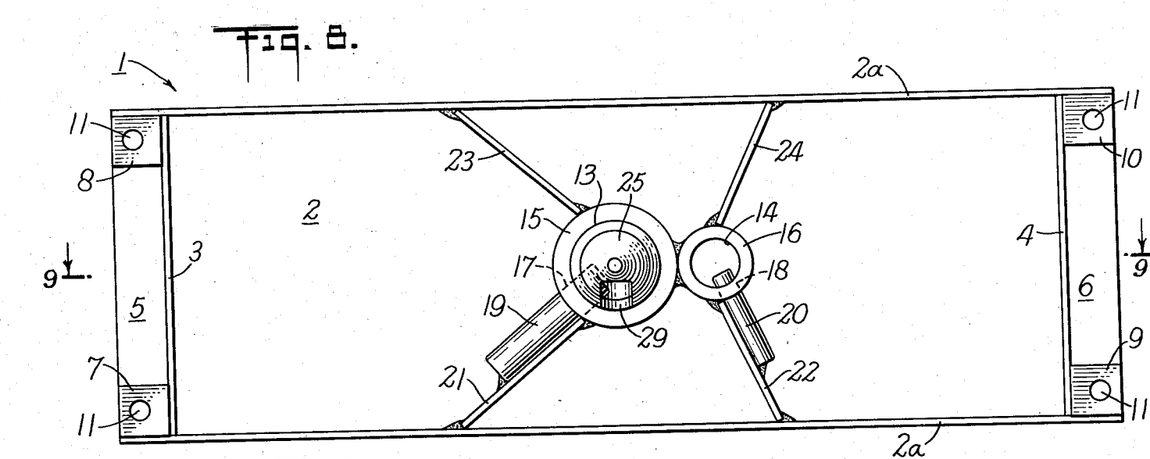
Fig. 8 is an underneath view of the base of the machine shown in Figs. 1 and 5.
Figure 9:
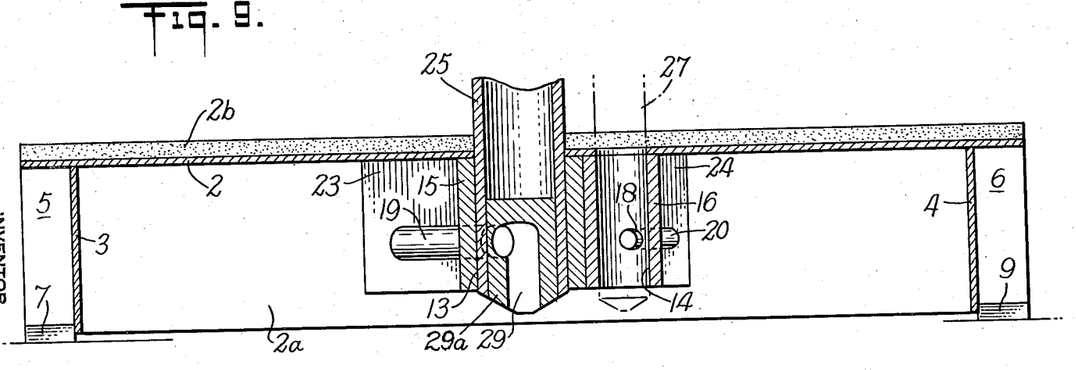
Fig. 9 is a vertical longitudinal section of the said base.

In the drawings, referring first to the form shown in Figs. 1 to 15, I have shown a base 1, Figs. 8 and 9, comprising an inverted U-shaped channel member, having a top 2 and sides 2a and longitudinal rubber friction wheel-holding pads 2b, having welded therein near the ends thereof transverse partitions or plates 3 and 4 providing end recesses 5 and 6, within the lower ends of which there are welded in place four steel or iron blocks 7, 8, 9 and 10, to form supporting legs or feet, provided, respectively, with vertical holes 11 to receive screws 12, Fig. 5, for attaching the machine to the floor.

In the said top 2 there is a large hole 13 for a large arbor and a small hole 14 for a small arbor, as referred to hereinafter, which register with a large tube 15 and a small tube 16, which are welded to the top 2. These two tubes are welded together. The large tube 15 has a large lateral hole 17 and the small tube 16 has a small lateral hole 18, into which locking pins 19 and 20 fit, respectively, the pins 19 and 20 being welded to inclined brace plates 21 and 22, welded to sides of the tubes 15 and 16, respectively, and to a side 2a of the base. There are also inclined brace plates 23 and 24 welded to the other sides of the tubes 15 and 16, respectively, and to the other side 2a of the base.

A large diameter screw-threaded arbor 25, having a tool-receiving slot 26 to receive a tool 26a at the top for rotation of the arbor, is arranged to be received in the tube 15 and alternatively a small-diameter screw-threaded arbor 27, having a similar tool-receiving slot 28, is arranged to be received in the tube 16. The two arbors 25 and 27 are constructed exactly alike, as to the locking thereof in the base 1, as well as the tool operating connections rotatably supported thereon, except for the relative size thereof. Accordingly, only the large arbor 25 and its connections will be described in detail, the corresponding parts fitting on the small arbor 27 being fitted to the size of the arbor 27.

The arbor 25 has a bayonet joint slot 29 in a tapered plug 29a to lock with the pin 19 and become centered when the arbor is inserted in the base 1 and rotated by the wrench 26a. Also, the arbor 25 has thereon an inverted hollow cone 30, Fig. 20, to fit within a central opening 31 in a wheel 32 which may, for instance, be a drop center wheel having a well 33 over which there may be the usual pneumatic tire shoe 34 having beads 35 and 36 located adjacent to wheel flanges of rims 37 and 38, respectively, and an inflatable tube 39 therein. A nut 40 with arms 41 thereon is screw-threaded on the arbor 25 to fasten the cone 30 in position against the wheel 32.

Above the nut 40 the arbor 25 has screw-threaded thereon a tool holder support 42 which has a vertical screw 43 for holding a tool holder shank 44 which passes through the tool holder support 42. The shank may be squared in cross-section having one corner 46 beveled as a guide to its insertion in the socket 45 to insure its correct position.

Figure 3:
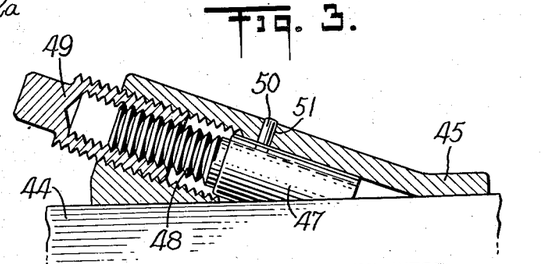
Fig. 3 is a vertical section showing an alternative locking means of the tool holder shank taken on line 3—3 of Fig. 6.

As an alternative, instead of the vertical screw 43, I may, as shown in Fig. 3, use a wedge 47 with a screw stem 48 operated by a headed sleeve screw 49. A pin 50 may be provided in a slot 51 to maintain the alignment of the wedge 47.

One end of the tool holder shank 44 may have a longitudinal cylindrical opening 52 to receive an end of a cylindrical off-set drive-bar 53, Fig. 4, provided with bends to permit different heights for convenience of its operation, particularly when working on the bead with the stripping tool, said drive-bar 53 having a lateral projection 54 thereon to be inserted in any desired one of a series of radial notches 55 on this end of the tool holder shank 44. The other end of the bar 53 may have a removable extension 54a, Fig. 4, inserted therein. The other end of the tool holder shank 44 has an inwardly tapered conical surface or recess 56, Fig. 15, to frictionally engage a similar conical flange 57 on a tool holder 58. On one side of said flange 57 there is a cylindrical boss 59 rotatably carried in a sleeve 60 forming a part of the tool holder shank 44. A retaining screw 61 in the sleeve 60 locks the boss 59 in the sleeve 60, entering an annular recess 62 provided on the said boss 59. In order to lock the tool holder 58 firmly in position I have provided on the tool holder shank 44 a flanged locking wedge 62a operated by a screw 62b spanning said flange or, instead, a compound screw 63 comprising a sleeve screw 64 having an outer screw-thread 65 threaded in the tool holder shank 44 and an inner screw-thread 66 of smaller pitch than the thread 65, said thread 66 carrying within the sleeve screw 64 an inner screw 67 provided with a head 68 bearing on the side of the flange 57 and being provided with a removable pin 69 projecting into a slot 70 to permit the advance of said screw 67 but prevent its rotation. The compound screw 63 can be used to exert friction resistance or a tight clamping action and as both threads 65 and 66 are in the same "hand" direction the head advances gradually to produce a high thrust load.

On the end of the tool holder 58 there is a cylindrical socket projection 71, for receiving a drive-bar such as the drive-bar 53, and having a series of notches 72 at one end and a series of notches 73 at the other end to receive the key 54 on the drive-bar 53, according to the direction in which the drive-bar 53 is inserted in the tool holder 58. A hole 74 is provided to give access to a spring supporting screw, as hereinafter referred to.

In the tool holder 58, between the cylindrical socket 71 and the flange 57, there is a tool-holding slot 75, for receiving any desired type of tool for use in the bead breaking, stripping, demounting and mounting of the tire. In order to clamp the tool in place there is provided a double wedge, comprising a cylindrical tool-lock wedge 76, having a tapered tool engaging face 77, located in an inclined hole 78 in the tool holder 58. The tapered face 77 has a retracting plunger 79 thereon pressed forwardly by a spring 80 supported by a screw 81. A second cylindrical wedge 82 has a tapered face 83 extending angularly into contact with the rear of the first wedge 76 and having a flanged head 84 fitting within a T-slot 85 on a screw 86 in a screw-threaded hole 87 in the tool holder 58.

Figure 16:
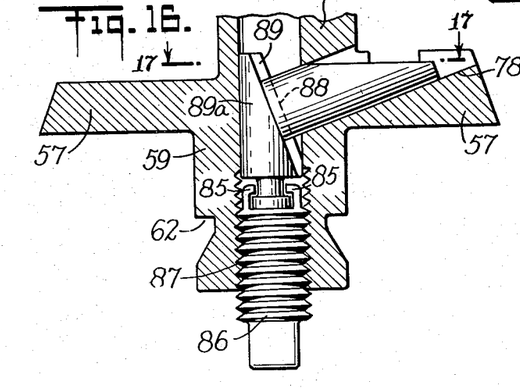
Fig. 16 is a horizontal section showing a modification having an undercut keyway to return the compound wedge such as in Fig. 15.
Figure 17:
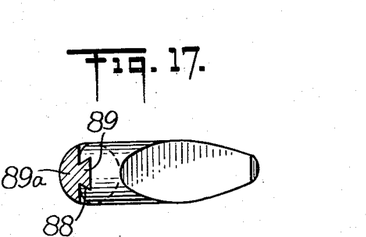
Fig. 17 is a horizontal section taken on line 17—17 of Fig. 16 with the tool holder portion omitted.

I have shown a modification of this construction in Fig. 16, for retracting the double wedge. In this instance the first cylindrical wedge has an undercut keyway 88 with tapered sides to receive a slidable dove-tail projection 89 on an angular cylindrical second wedge 89a provided with a flanged head cooperating with the screw 86.

Figure 18:
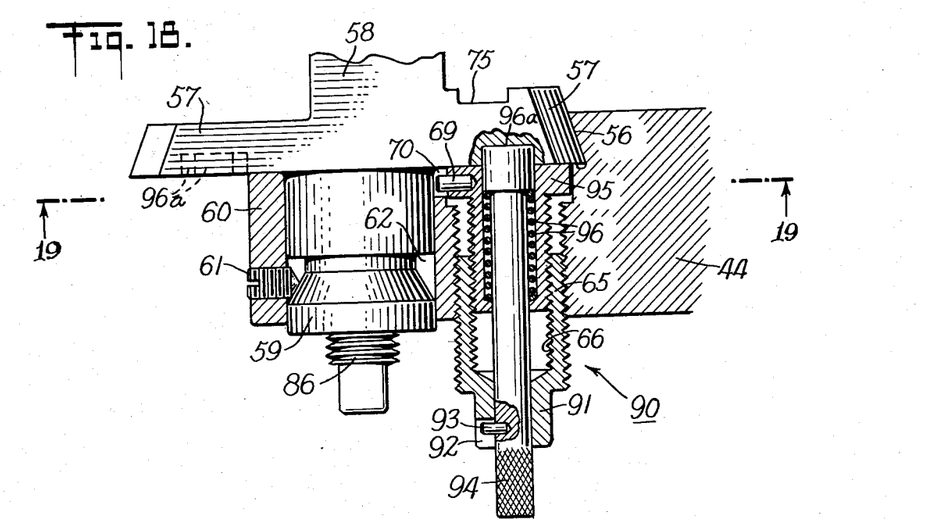
Fig. 18 is a horizontal section showing a modification of the compound screw of Fig. 15, having a spring-pressed locking pin therein.
Figure 19:
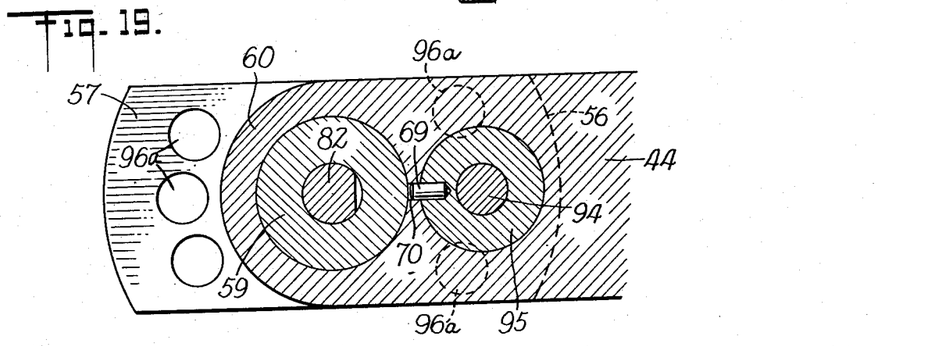
Fig. 19 is a vertical section taken on line 19—19 of Fig. 18.

In Fig. 18 I have shown a modification of or addition to the compound screw 63. In this instance there is provided a compound screw 90 with the same differential threads 65 and 66 and removable pin 69, as before. In this instance, however, there is provided an outer screw 91 having a slot 92 at its outer end to receive loosely a headed pin 93 carried near the outer end of a manually releasable locking pin 94 projecting through the outer end of the screw 91 and through an inner screw 95, within which it carries a helical spring 96 supported by an annular shoulder in the end of the screw 95. The head of the locking pin 94 is arranged to be received in any one of a circular series of holes 96a in the tapered flange 57.

Figures 10, 11, 12, 13, 14:
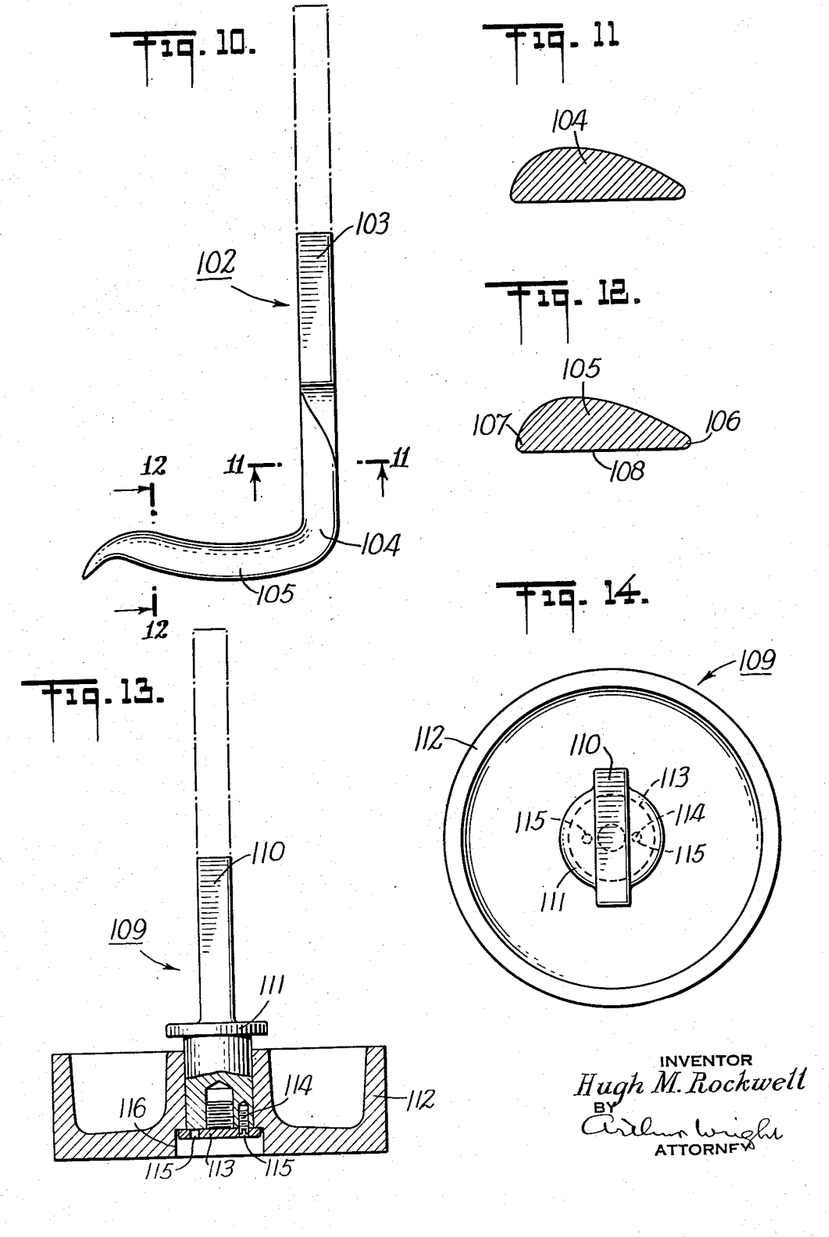
Fig. 10 is a side elevation of the "off" tool showing alternative lengthening thereof for small tires.
Fig. 11 is a horizontal cross-section thereof taken on line 11—11 of Fig. 10.
Fig. 12 is a vertical cross-section thereof taken on line 12—12 of Fig. 10.
Fig. 13 is a vertical section of the "on" tool.
Fig. 14 is a plan view of the "on" tool.
Figure 15:
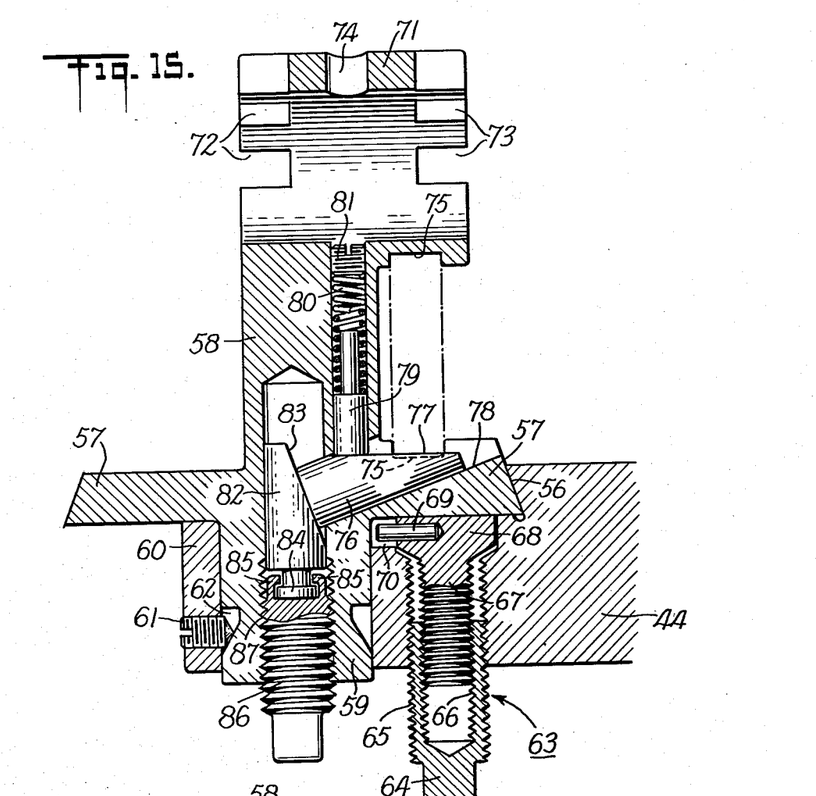
Fig. 15 is a horizontal section of the tool holder having a retractible compound wedge tool-locking means and a compound screw locking means that may be used with the tool holder.
Figure 21:
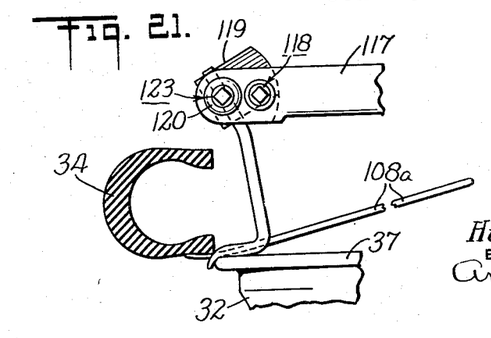
Fig. 21 is an elevation of the modification in Fig. 20 and showing, also, an "off" tool with an elongated bent shank for use with small tires, this lengthening of the shank being also applicable to the "on" tool of Figs. 13 and 14.

In the tool slot 75 there may be carried any type of tool, as, for instance, for bead breaking or stripping, or for taking a tire "off," or for putting the tire "on" the wheel. For instance, I may introduce a bead breaking or stripping tool 97, Fig. 1, having a shank 98 provided with a narrowed end 99 to aid in putting the tool in the slot 75, with an inclined outer end 100 to insure the tool clearing the outer edge of the wheel flange when stripping the tire therefrom and a laterally offset toe portion 101 of any desired shape, as shown, for example, in my copending application Ser. No. 46,445 aforesaid. Or, instead, I may place in said slot 75 an "off" tool 102 having a shank 103, of rectangular cross-section, which may be long for small tires or short for large tires, as shown in Fig. 10. A lower part 104 of the shank 103 is narrowed in width to aid in the insertion of the tool in the slot 75, and has a cross-section, as shown in Fig. 11, while at the lowermost part of the shank 103 there is a substantially horizontal finger or toe portion 105 having a curvature like the radius of its swing on the tool holder axis, as shown in Fig. 12, with a narrow curved leading edge 106 and a thicker curved rear edge 107 as well as a flat lower surface 108, to fit more or less closely over the rim 37 of the wheel, as shown in Fig. 21. In utilizing the "off" tool I may use therewith a tire iron 108a, as shown for example in Fig. 21. Or, instead, I may insert in the tool slot 75 an "on" tool 109 having a more or less long shank 110 and having an upper end like the shank 103 of the "off" tool. The shank 110, at its lower end, has an enlarged flanged end 111 to act as a journal for a roll 112, rotatably held in the journal 111 by a screw cap 113 provided with a locking screw 114 located in one of two spanner holes 115. The periphery of the screw cap 113 extends into a deep annular recess 116 so that the clearance provided thereby allows the roll to float so that it will not jam against the wheel in case it is forced down by the thread on the arbor 25 or in case the wheel is not mounted true.

In the modification of my invention shown in Figs. 20 to 24, the construction is the same as that described above, but in this modified form of my invention I have provided a better location for the tool slot, which may have therein a stripper tool 97, an "off" tool 102 or an "on" tool 109 and which, in this instance, supports the tool substantially on or near the axis of the tool holder so as to make the structure more compact and simple, and in this form of my invention I may provide a compound screw for clamping the tool in its operative position. Accordingly, here, I have provided a tool holder shank 117 like the tool holder shank 44, having therein a compound screw 118, constructed as hereinabove described in Fig. 15, to be pressed against a tool holder 119. The tool holder 119 has a rotatable boss 120 and a drive-bar socket 121 between which there is a tool slot 122, for carrying any of the previously mentioned tools on or near the axis of rotation of the boss 120. In this instance, however, although a compound wedge construction such as 77, 82 and 86 could be used herein, the said boss preferably carries a compound screw 123, constructed just like the compound screw 118, for clamping the tool in the slot 122. Also, the same side of the tool holder 119 is always used with the same side up, because of the axial location of the tool, whereas in the preceding figures, with the tool not located on the tool holder axis, the tool holder may be inverted when desired to make the most convenient approach of the tool to the tire. For instance, Fig. 5 shows the off center position of the "off" tool 102, which is sometimes also the position of the off center "on" tool 109 for small tires, whereas the tool holder is turned around 180° therefrom when using the stripper tool 97 and the "on" tool for the large tires, Fig. 1.

In the operation of my invention, referring first to the forms of my invention shown in Figs. 1 to 17, the wheel 32 carrying the tire 34, generally with an inner tube 39, is placed over the friction pads 2b, preparatory to inserting the large arbor 25, in the case of large wheels, or the small arbor 27 in the case of small wheels. The particular one of the arbors used, together with its assembled parts, is then fastened in upright position in the tube 15 or the tube 16 by turning the particular arbor, by means of the wrench 26a, so as to engage the pin 19 or the pin 20 with the bayonet slot 29 at the lower end of the arbor. The wheel 32 is supported by the two longitudinal friction pads or strips of rubber 2b so as to effectively prevent rotation of the wheel 32 while operating to mount or demount the tire 34 for the wheel 32. Previous to the operation, the wheel 32 is forced against the friction pads or strips 2b by the cone 30 fitting in the central opening 31 of the wheel into which it has been forced by the rotation of the nut 40 until tightly secured in place. The tool holder, when inserted over the wheel, has assembled thereon the support 42 which is screwed over the top of the arbor 25 and the tool holder shank 44 which is inserted in the tool holder support and fastened therein in any desired position by the screw 43 or the wedge clamp 48, 49. Also, the tool holder shank 44 is adjusted in any desired radial positions, for instance, when the bead breaking or stripper tool 99 is used initially on the tire so that the shank of the tool is substantially vertical and the toe 101 thereof is located just over the outer edge of the wheel rim 37. The tool holder support 42 is now rotated downwardly until the said toe 101 is at an elevation just above the bead 35 of the tire 34. The drive-bar 53 is then inserted in a position outside of the tool holder 58, in the socket 71 for example, so that the key 54 is received in one of the recesses 72 or one of the recesses 73, or, if desired, this drive-bar or a similar drive-bar may be inserted in the tool holder shank 44 recess 52 so that the key 54 is received in one of the notches 55. In other words, the drive-bar will be received in the socket 71, but if further force is to be applied, another similar drive-bar may be received in the end of the tool holder shank 44. The drive-bar 53 and stripping tool for breaking the bead 35 and stripping the tire are then rotated clockwise so that the screw-thread on the arbor 25 forces the tire bead away from the rim flange of the wheel as the stripper tool 99 is advanced downwardly. During the downward movement of the stripper tool 99 the latter is caused to hug closely the outer face of the wheel 32 by the downward pressure on the drive-bar 53 rotating the tool 99 on its horizontal axis on the journal 59. This is continued until the bead 35 of the tire is forced free from the bead seat. The wheel can then be turned over and the other bead 36 of the tire can be broken away and removed from its position adjacent to the flange or rim 38. Both beads will then have been pushed free of the bead seats. Thereupon, the stripper tool 99 is removed and, instead, the "off" tool 102 is then clamped in the socket 75 with the shank of the tool cocked inwardly and the toe 105 of said tool inserted over the rim beneath the uppermost bead 35 of the tire adjacent to the tire iron, see Fig. 21, which has been previously inserted to raise the bead, and with the drive-bar, when operating on the top bead, projecting to the outside or inside of the tool holder 58. But, when operating on the bottom bead the drive-bar is placed on the inside of the tool holder 58, with large tires. But, in small tires using an "off" or "on" tool with extended shank, the drive-bar can be on the outside of the tool holder 58. The said uppermost bead is then removed from the uppermost rim 37 by rotating the tool holder support 42 counterclockwise, so as to remove the upper bead 35 from the wheel 32. Also, the slight upward movement causes the "off" tool to clear itself at the same time. Thereupon, in a similar manner, the said "off" tool is adjusted on the arbor and tool holder until the toe 105 is underneath the other bead 36 and the tool holder support 42 is then rotated in the same way until the bead 36 is moved over the rim 37.

When the tire 34, containing the inner tube 39, is to be placed onto the wheel 32, the lower bead 36 is placed in the well beneath one side of the rim 37 and the "on" tool 109 is then clamped in the socket 75 and positioned so that the outside of the roll 112 is slightly beyond the wheel rim and fits against the inner face of the part of the bead 36 which has not yet passed over the rim 37. Upon rotating the tool holder support 42 the bead will gradually be moved downwardly, due to the tension between the opposite sides of the bead, so as to carry the edge of the bead 36 entirely over the rim 37. Similarly, the other bead 35 is moved over and beneath the rim 37. It will be understood that when rotating the "on" tool 109 the tire bead will be forced outwardly until each particular bead has passed over the rim 37. Upon the inflation of the inner tube 39 the beads 35 and 36 will move outwardly until they are positioned against the respective flanges or rims 37 and 38.

It will be understood that in the case of any of these tools, but especially in using the stripper tool 97, the tool can be released or even adjusted under pressure.

Figure 20:
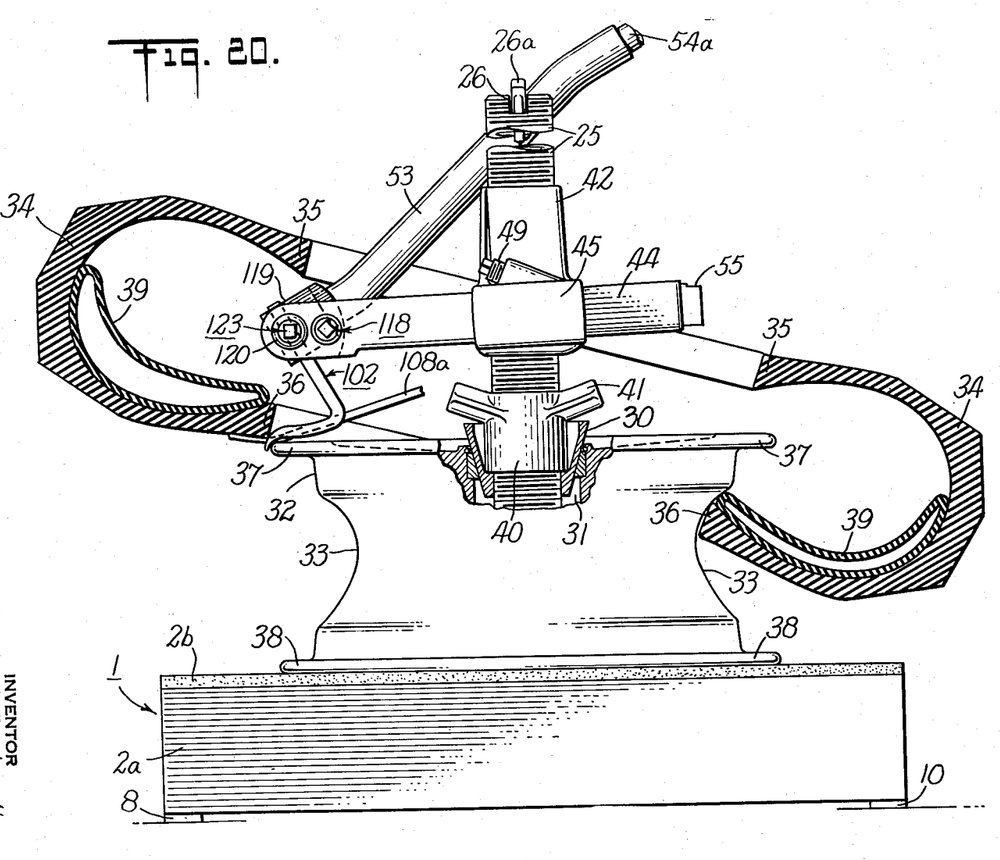
Fig. 20 is a side elevation, partly in section, showing a modified form of tool holder in which the tool is positioned on the tool holder axis, showing an "off" tool also a drop center wheel having the usual well therein.

Furthermore, in the construction and operation of all the different forms of my invention, as above described, the arrangement of the tool holder shank 44, the tool 97 and the drive-bar 53, as illustrated in Fig. 7 for example, is such that they provide an assembly located close together, with the tool 97 between the tool holder shank 44 and the drive-bar 53, so that this assembly can be effectively placed inside the tire in moving the lower bead 36 over the rim flange 37. This advantage will be readily seen, due to the fact that in removing the said bead 36 the plane of the tire is tilted, not only as is shown in Fig. 20, but is usually or often tilted so that the foreground part of the tire in Fig. 20 is above or below the tire position in said Fig. 20. In other words, while the said assembly shown in Fig. 7 is rotated substantially in a horizontal plane, the tire being operated upon, in Fig. 7, would be tilted not only upwardly at the bottom of Fig. 7 but also at the right or left of said Fig. 7 simultaneously. The said arrangement of said assembly thus gives effective access to the interior of the tire when tilted simultaneously in both said directions. It is also some advantage to have the tool 97 located radially approximately on the line passing through the arbor axis between the tool holder shank 44 and the drive-bar 53, and so that the drive-bar 53 can pass outwardly or inwardly to one side of the arbor axis when the drive-bar 53 is in the inner position in the socket 121 with or without entering the notches 73.

Figure 1:
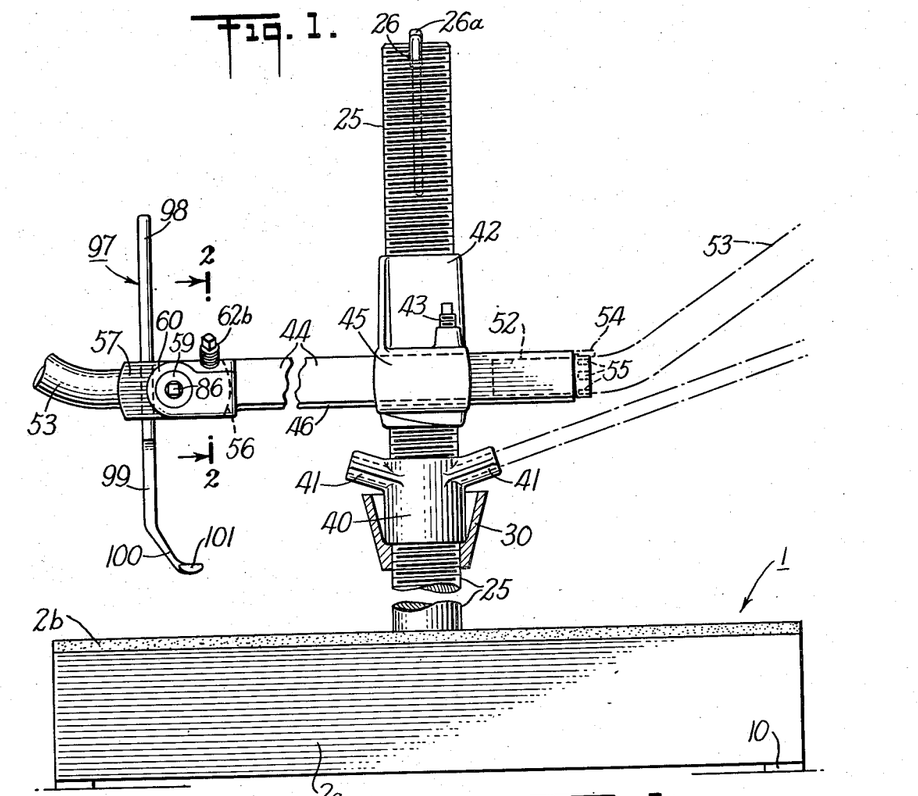
Fig. 1 is a side elevation of a machine made in accordance with my invention, using, for example, a large diameter arbor and having a stripper tool therein.
Figure 2:
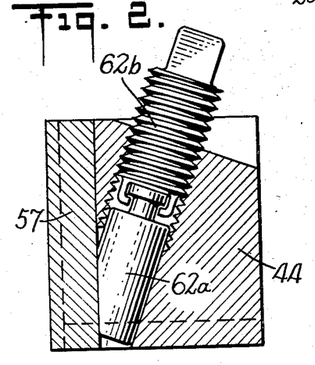
Fig. 2 is a vertical section of Fig. 1, taken on line 2—2, showing the wedge lock between the tool holder and the tool holder shank.
Figures 22, 23:
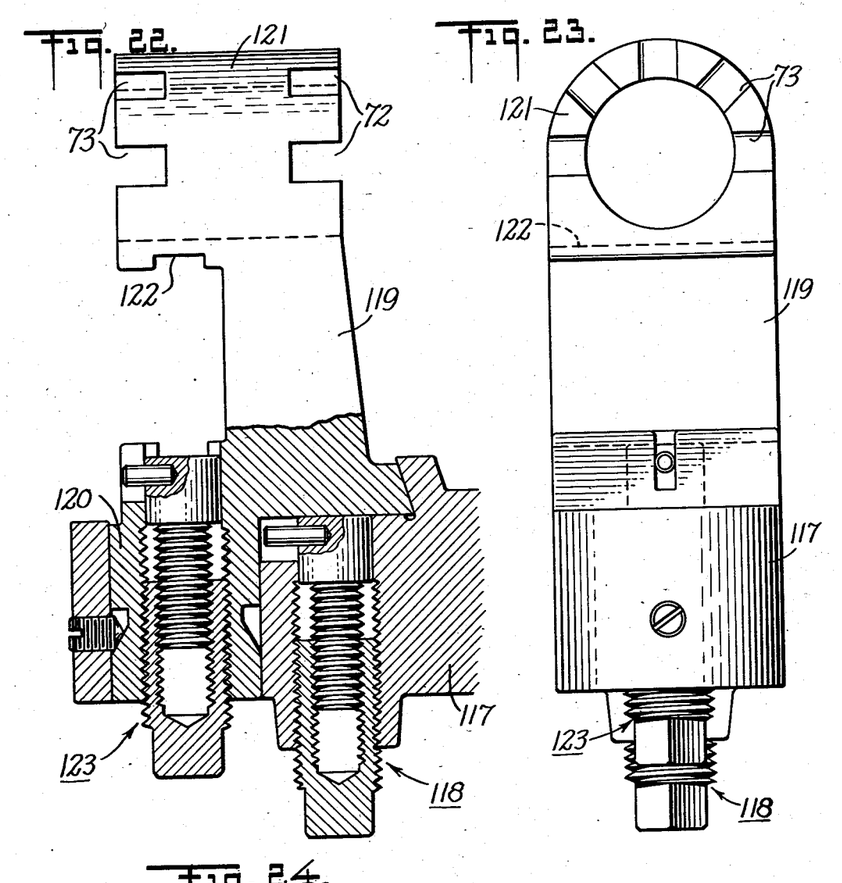
Fig. 22 is a horizontal section of the tool holder and tool holder shank of Figs. 20 and 21.
Fig. 23 is a side elevation of the parts shown in Fig. 22.
Figure 24:
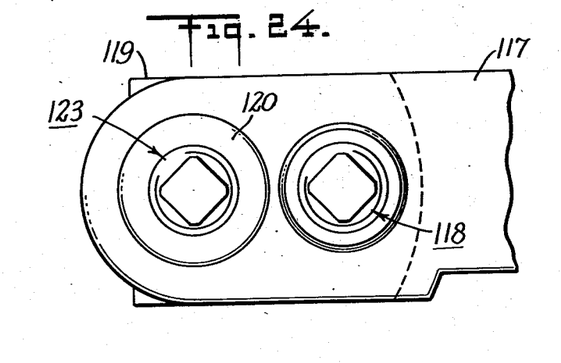
Fig. 24 is an end elevation of the parts shown in Fig. 22.

In the modification shown in Figs. 18 to 24, the operation is substantially the same except that in this instance the tool holder slot 122 is, as shown in Figs. 20 to 22, located approximately on the axis of rotation of the tool holder 119, thereby making it unnecessary to invert the tool holder 119, as shown for instance in Figs. 1 and 5, respectively, to locate the tool in different radial positions as to the arbor 25. Consequently, the structure is simpler and more compact in the construction and operation thereof. Of course, as will be readily understood and as shown in Fig. 18, the radial position of the tool holder can be maintained or positively locked in any one of several positions by manually pulling out the pin 94 and resetting it in one of its different sockets 96 to change the radial distances of the tool from its centers of rotation.

While I have described my invention above in detail I wish it to be understood that many changes may be made therein without departing from the spirit of the same.

Furthermore, when I have referred to the tool holder shank being rotatable horizontally, this is to be understood as including the rotation thereof horizontally as well as approximately horizontally, for instance in the case of the helical rotation of the tool holder shank on the arbor.

I claim:

1. A tire changer, comprising an arbor, a tool holder shank horizontally rotatable with regard to said arbor, a tool holder having a bearing rotatable on said tool holder shank on a horizontal axis, a drive-bar socket on said tool holder, and a tool socket located on the tool holder and provided with a tool clamping means passing through said bearing.

2. A tire changer, comprising an arbor, a tool holder shank horizontally rotatable with regard to said arbor, a tool holder having a bearing rotatable on said tool holder shank on a horizontal axis, a drive-bar socket on said tool holder, and a tool socket located on the tool holder and provided with a tool clamping means passing through said bearing, said drive-bar socket being positioned so as to receive a drive-bar passing to one side of the arbor axis.

3. A tire changer, comprising an arbor, a tool holder shank horizontally rotatable with regard to said arbor, a tool holder having a bearing rotatable on said tool holder shank on a horizontal axis, a drive-bar socket on said tool holder, and a tool socket located on the tool holder and provided with a tool clamping means passing through said bearing, said drive-bar socket being positioned so as to receive a drive-bar passing to one side of the arbor axis and the tool socket being adapted to locate a tool therein on a radial line passing approximately through the arbor axis between the position of the tool holder shank and the drive-bar.

4. A tire changer, comprising an arbor, a tool holder shank located on one side of the arbor horizontally rotatable with regard to the arbor, a tool holder rotatable on said tool holder shank on a horizontal axis and having a tool socket, said tool holder having a drive-bar socket located on the other side of the arbor and provided with inwardly and outwardly oppositely directed openings for receiving a drive-bar in either one of said openings in each of which a bent drive-bar is rotatably adjustable.

5. A tire changer, comprising an arbor, a tool holder shank horizontally rotatable with regard to the arbor, a tool holder rotatable on said tool holder shank on a horizontal axis and having a tool socket, said tool holder shank having a drive bar socket with notches along its circular edge, a bent drive bar having a socket-engaging portion being rotatably received in said socket and having notch-engaging means to selectively engage one of said notches and thereby adjust the height of the hand grip portion.

References Cited in the file of this patent

UNITED STATES PATENTS

| Number | Name | Date |
|---|---|---|
| 866,547 | Wilkinson | Sept. 17, 1907 |
| 954,146 | Stevens | Apr. 5, 1910 |
| 1,316,390 | Rishard | Sept. 16, 1919 |
| 1,341,727 | Weaver | June 1, 1920 |
| 1,493,983 | Hurley | May 13, 1924 |
| 1,656,964 | Turner | Jan. 24, 1928 |
| 1,713,066 | Wolf | May 14, 1929 |
| 1,742,590 | Freivogel | Jan. 7, 1930 |
| 1,793,864 | Manley | Feb. 24, 1931 |
| 1,938,940 | Smith | Dec. 12, 1933 |
| 2,201,982 | Bazarek | May 28, 1940 |
| 2,471,642 | Moltz | May 31, 1949 |
| 2,482,789 | Moore | Sept. 27, 1949 |
| 2,497,644 | Watkins | Feb. 14, 1950 |
| 2,505,172 | Coats | Apr. 25, 1950 |

FOREIGN PATENTS

| Number | Country | Date |
|---|---|---|
| 765,192 | France | Mar. 19, 1934 |
| 578,761 | Great Britain | July 10, 1946 |
| 258,165 | Switzerland | Apr. 16, 1949 |